UNITED STATES PATENT OFFICE.

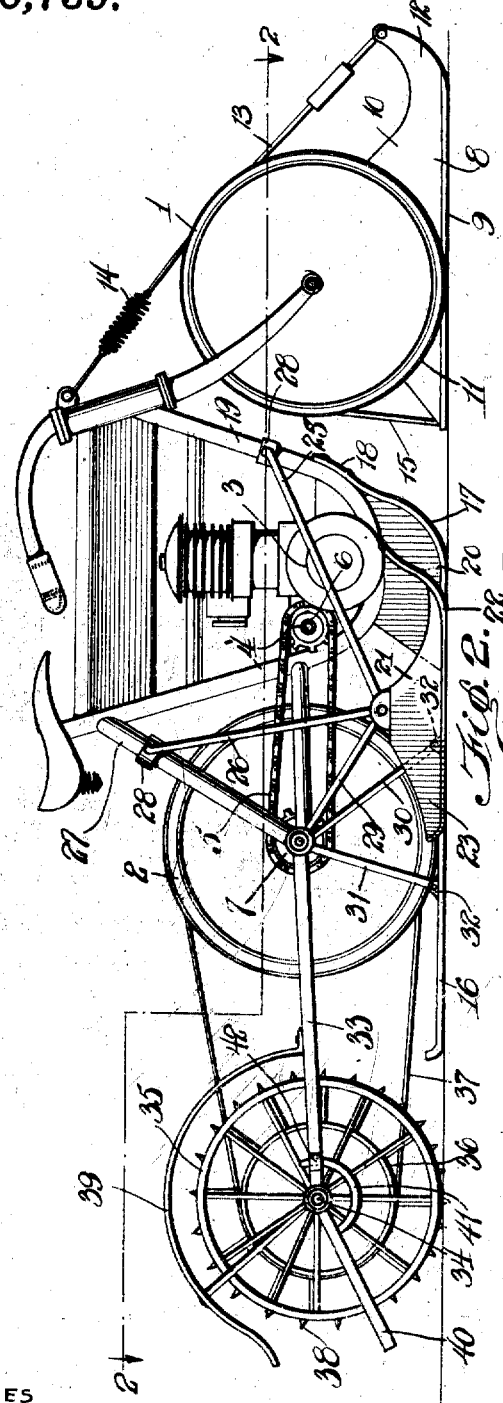
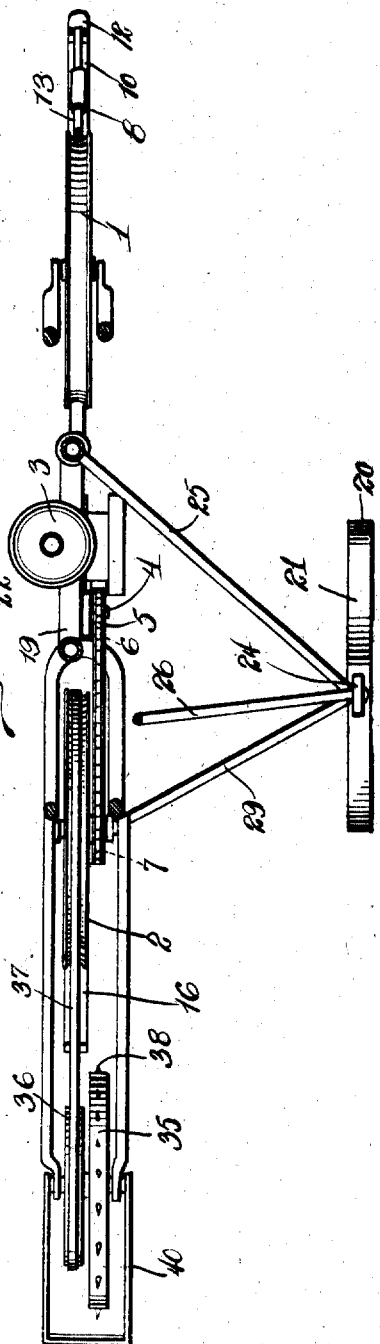

ALFRED WELLS, OF VEGA, SOUTH DAKOTA.

SLEIGH-RUNNER ATTACHMENT.

1,250,739.     Specification of Letters Patent.     Patented Dec. 18, 1917.

Application filed November 20, 1916. Serial No. 132,401.

*To all whom it may concern:*

Be it known that I, ALFRED WELLS, a citizen of the United States, residing at Vega, in the county of Brule and State of South Dakota, have invented certain new and useful Improvements in Sleigh-Runner Attachments, of which the following is a specification.

This invention has relation to sleigh runner attachments for motorcycles, and the like, and the nature and objects thereof will be readily apparent to those skilled in the art to which it appertains in the light of the following explanation of the accompanying drawings, illustrating what I now believe to be the preferred embodiment, or mechanical expression, of my invention from among other forms and arrangements, within the spirit thereof or the scope of the appended claims.

However, an object of the invention is to provide a device for attachment to a motorcycle, whereby the same may be employed for traveling over snow and ice, and embodying means operable by the motor of the motorcycle for the purposes of propulsion.

Another object of the invention is to provide an attachment for a motorcycle of the character above set forth wherein the mentioned propelling means may be operatively associated with the propelling mechanism of the motorcycle, without alteration of said propelling mechanism, or the addition of extra parts.

In addition to the foregoing my invention comprehends improvements in the details of construction and arrangement of parts to be hereinafter more fully described, and particularly set forth in the appended claims.

In the accompanying drawings, in which similar and corresponding parts are designated by the same characters of reference throughout the several views in which they appear, Figure 1, is a view in side elevation of a motorcycle illustrating the application thereto of my invention, and Fig. 2, is a horizontal section taken on the line 2—2 of the preceding figure.

With reference to the drawings, 1 and 2 indicate respectively the front and rear wheels of a motorcycle of conventional type, and 3 the motor having the usual drive shaft 4. The rear wheel is driven from the motor, through the medium of a chain 5 which passes over a sprocket rotatable with the drive shaft 4 and a sprocket 7 rotatable with the rear supporting wheel 2 of the motorcycle.

The sleigh runner attachment which forms a part of my invention includes a forward sleigh runner member 8 having a ground engaging runner 9 extending longitudinally beneath the forward supporting wheel, and having a vertically extending web 10 which is provided with an arcuate cut-away portion 11 in which the periphery of the forward supporting wheel 1 is adapted to rest. The forward end 11 of the runner attachment 8 is curved upwardly as indicated, and connected to the central portion of the handle bars by means of a sectional rod 13, having interposed therein a coil spring 14. The rear end of the forward runner section 8 is further secured to the forward supporting wheel, by means of an upstanding brace 15.

The rear wheel 2 is supported upon a rear runner section comprising a longitudinally extending ground engaging runner 16, extending forward toward the vertical center of the motorcycle, with its forward extremity 17 curved up and secured at 18 to the under side of the substantially U-shaped frame member 19 of the motorcycle. The lower intermediate portion of the U-shaped frame member 19 is supported upon a vertically extending web 20 which is disposed between said U-shaped member, and the forward terminal 17 of the rear runner, whereby the weight of the motorcycle which is centralized beneath the motor may be suitably supported.

Located to one side of the motorcycle, and preferably the righthand side thereof, is a third runner member 21 having a lower longitudinally extending ground engaging runner 22 and a vertically extending web 23 supported upon said runner and having formed at its upper portion an ear 24. Brace rods 25 and 26, extend from and are connected to said ear 24 to one member of the U-shaped member 19 to the rear fork 27 of the motorcycle, the said brace rods being connected to said frame members by means of collar fastenings 28. A brace rod 29 also extends from and is connected to said ear 24 to the bearing of the rear supporting motorcycle wheel, which is provided at the lower end of the rear fork 27.

The rear runner member 16 is braced and secured to the motorcycle through the medium of upwardly converging, forward and rear brace members 30 and 31, secured at their lower ends in longitudinal spaced ears 32 formed on the runner 16, and at their converging upper ends to the bearing portion at the lower end of the rear fork 27. The said braces 30 and 31 are of such a length as to dispose the rear supporting wheel above the runner 16 to permit free rotation thereof, at all times.

Before applying the above described sleigh runner attachment to a motor vehicle for travel over snow and ice, it is necessary for the purposes of this invention to remove the tires from the supporting wheels. The propelling mechanism of the vehicle is then associated with the same in the following manner: Side thill members 33 are extended rearwardly from the bearing of the rear supporting wheel 2 in parallelism, and adapted to support at their rear ends the shaft 34 of a propelling wheel 35 for rotation. The said wheel 35 is provided with a concentric pulley 36 around which a belt or the like 37 passes, the same also partially encircling the rear supporting wheel after the tire has been removed therefrom whereby a circumferential groove is provided for the reception of said belt. The periphery of the propelling wheel 35 is provided throughout with radial studs 38 whereby a secure engagement of the wheel with the ground may be insured. A substantially semi-circular guard 39 may be extended over the upper portion of the propelling wheel and secured to the side thill 33, to prevent spattering of ice and snow particles during the travel of the machine. A pivoted supporting member 40 is also connected to the shaft 34 of the propelling wheel, said support having a semi-circular member 41 disposed concentrically with relation to the support of the propelling wheel, and adapted for sliding engagement in a guide member or the like 42 secured to one of the side thills 33. The supporting member is adapted for oscillation about its point of connection with the shaft 34 to raise the propelling wheel from the ground, when the motor of the vehicle is to be tested or for other purposes, said support being readily movable to a position out of engagement with the ground, to permit lowering of the propelling wheel.

In view of the foregoing the operation of the invention should be obvious, the rotation of the rear supporting wheel 2 under the influence of the prime mover 3 is transmitted to the rear propelling wheel, which through engagement with the ground urges the machine as a whole forward. The speed of the vehicle may be varied by controlling the admission of fuel to the motor in the same manner as the vehicle would be controlled if traveling upon its supporting wheels. If the forward runner 18 strikes an obstruction in the road, the partial rotation of the forward supporting wheel 1, which would result, is taken up by the coil spring 14 interposed in the rod 13.

Thus it will be seen that I have provided a novel sleigh runner attachment for motorcycles wherein the parts of the vehicle are pivotally supported, and wherein the propelling means for use in engagement with the snow or ice covered ground is associated with the propelling means of the motorcycle, without alteration of the parts or an addition of others.

While I have illustrated and described my invention with some degree of particularity, I realize that in practice various alterations thereover may be made, and I therefore reserve the right and privilege, of changing the form of the details of construction, or otherwise altering the arrangement of the correlated parts without departing from the spirit of the invention or the scope of the appended claims.

Having thus described my invention what I claim as new and desire to secure by Letters Patent is:—

1. A sleigh runner attachment for two-wheeled cycles including runners disposable beneath the supporting wheels of the cycle, braces for supporting the rear wheel out of contact with its corresponding runner, a ground engaging propelling wheel having a concentric pulley rotatable therewith, means connected to the cycle frame forming a bearing for the propelling wheel, a flexible transmission element passed around said pulley and the rear supporting wheel of the cycle.

2. A sleigh runner attachment for two-wheeled cycles, including runners disposable beneath the supporting wheels of the cycle, braces for raising the rear supporting wheels out of engagement with the runner, thills extending from the bearing of the rear supporting wheel rearward, a propelling wheel journaled in the rear ends of said thills, a pulley, mounted for rotation concentric with said propelling wheel, and a flexible transmission element passing about said pulley and the rear cycle wheel.

3. A sleigh runner attachment for two-wheeled cycles, including a forward runner disposable beneath the forward supporting wheel of the cycle, a rear runner disposable beneath the rear supporting wheel of the cycle, and extending forward beneath the frame, and having connection with the cycle frame, a web disposed beneath the frame and supported upon the rear runner, to support the intermediate portion of the cycle frame upon said runner, braces extending from the rear runner and to the cycle frame, to support the rear supporting wheel thereof out of engagement with its runner, and a ground engaging propelling wheel operable by rotation of the rear cycle wheel.

In testimony whereof I affix my signature in presence of two witnesses.

ALFRED WELLS.

Witnesses:
W. W. SEDGWICK,
HENRY G. PETERSEN.